(12) United States Patent
Charier et al.

(10) Patent No.: US 7,591,594 B2
(45) Date of Patent: Sep. 22, 2009

(54) TURBOMACHINE WITH A COMPACT ROLLER BEARING

(75) Inventors: Gilles Charier, La Grande Paroisse (FR); Guy Dusserre-Telmon, Sivry-Courtry (FR); Marc Marchi, Le Mee sur Seine (FR); Jean-Pierre Mourlan, Nogent sur Marne (FR); Patrice Rosset, Le Chapelle Gauthier (FR); Zoltan Zsiga, Avon (FR)

(73) Assignee: SNECMA, Paris (FR)

( * ) Notice: Subject to any disclaimer, the term of this patent is extended or adjusted under 35 U.S.C. 154(b) by 768 days.

(21) Appl. No.: 11/072,260

(22) Filed: Mar. 7, 2005

(65) Prior Publication Data

US 2005/0196088 A1 Sep. 8, 2005

(30) Foreign Application Priority Data

Mar. 5, 2004 (FR) .................................. 04 02328

(51) Int. Cl.
*F16C 43/04* (2006.01)
*F16C 33/58* (2006.01)
*F01D 25/16* (2006.01)

(52) U.S. Cl. ........................ 384/585; 384/569; 384/584; 416/194

(58) Field of Classification Search ................. 384/569, 384/584, 585, 473, 474, 475; 60/226.1; 416/194, 416/195

See application file for complete search history.

(56) References Cited

U.S. PATENT DOCUMENTS

| 2,804,323 | A | * | 8/1957 | Morley ........................ 403/194 |
| 3,393,533 | A | | 7/1968 | Wilkinson |
| 3,970,398 | A | | 7/1976 | Wilson |
| 4,201,513 | A | * | 5/1980 | Sales ............................... 416/2 |
| 4,456,425 | A | | 6/1984 | McCarty et al. |
| 4,479,682 | A | * | 10/1984 | Olivier ........................ 384/475 |
| 4,804,288 | A | | 2/1989 | Tiernan, Jr. |
| 5,288,210 | A | | 2/1994 | Albrecht et al. |
| 5,580,183 | A | * | 12/1996 | Brackoneski et al. .... 403/359.1 |
| 5,685,650 | A | * | 11/1997 | Martinie et al. ............. 384/538 |
| 2004/0062460 | A1 | * | 4/2004 | Dusserre-Telmon et al. . 384/475 |

FOREIGN PATENT DOCUMENTS

FR 1 054 379 2/1954

OTHER PUBLICATIONS

Timken Corporation, "Bearings—Comparing other bearing types", 2000.*

* cited by examiner

*Primary Examiner*—Thomas R Hannon
*Assistant Examiner*—Justin Krause
(74) *Attorney, Agent, or Firm*—Oblon, Spivak, McClelland, Maier & Neustadt, L.L.P.

(57) ABSTRACT

A turbomachine roller bearing that supports a shaft constituted by a trunnion of a shaft line of a high-pressure spool of a turbomachine to rotate relative to a stationary support that is connected to a casing of the turbomachine, said bearing comprising rollers inserted between an outer ring disposed adjacent to the stationary support and an inner ring disposed adjacent to the high-pressure trunnion, the inner ring extending along the axis beyond a downstream end of the high-pressure trunnion to which it is secured by clamping means, and being provided with anti-rotation means for preventing said inner ring from rotating relative to the high-pressure trunnion.

13 Claims, 4 Drawing Sheets

TURBOMACHINE WITH A COMPACT ROLLER BEARING

BACKGROUND OF THE INVENTION

The present invention relates to the general field of turbomachine roller bearings, and more particularly it provides a roller bearing of the type for supporting a high-pressure trunnion to rotate relative to a stationary support that is connected to a casing of a turbomachine.

In a turbomachine, the trunnion of a shaft line of the high-pressure spool is generally supported by a roller bearing to rotate relative to a stationary support that is connected to the casing.

Such a roller bearing is described with reference to FIG. 6. In this figure, the high-pressure spool of the turbomachine consists, in particular, of a high-pressure turbine disk 100 on which rotor blades (not shown) are mounted to move about a longitudinal axis X-X of the turbomachine. A shaft 102, which constitutes a trunnion of the shaft line of the high-pressure spool of the turbomachine, is secured to the high-pressure turbine disk 100 via a bolted connection 104. The high-pressure trunnion 102 is supported by a roller bearing 108 to rotate relative to a stationary support 106 that is connected to the casing of the turbomachine.

The roller bearing 108 consists of rollers 110 that are inserted between an outer ring 112 disposed adjacent to the stationary support 106 and an inner ring 114 disposed adjacent to the high-pressure trunnion 102. The outer ring 112 and the inner ring 114 constitute races for the rollers 110.

The outer ring 112 of the bearing 108 is directly secured to the stationary support 106. The inner ring 114 is mounted on an outer surface of the high-pressure trunnion 102, at its downstream end. A clamping nut 116 disposed downstream from the inner ring 114 serves to hold said inner ring axially against the high-pressure trunnion 102.

Such a roller bearing configuration presents numerous drawbacks. In particular, use of a fitted inner ring that is independent from the high-pressure trunnion increases the radial size of the roller bearing and constitutes additional weight. Moreover, the presence of a clamping nut necessary for retaining the inner ring and disposed downstream from the inner ring increases the axial size of the assembly.

In order to solve such problems, it has been envisaged to integrate the inner ring of the roller bearing directly in the high-pressure trunnion. That technique also has drawbacks. Firstly, in the event of failure of the roller bearing, it is necessary to replace the entire high-pressure trunnion, which increases costs. Secondly, the connection between the inner ring and the high-pressure trunnion is made by welding two different metals together, which is a technique that is difficult to master.

OBJECT AND SUMMARY OF THE INVENTION

Therefore, the present invention aims at mitigating such drawbacks by proposing a roller bearing that is compact, light in weight, and easy to maintain.

To this end, the invention provides a turbomachine roller bearing that supports a shaft constituted by a trunnion of a shaft line of a high-pressure spool of a turbomachine to rotate relative to a stationary support that is connected to a casing of the turbomachine, said bearing comprising rollers inserted between an outer ring disposed adjacent to the stationary support and an inner ring disposed adjacent to the high-pressure trunnion, wherein the inner ring extends along the axis beyond a downstream end of the high-pressure trunnion to which it is secured by clamping means, said inner ring also being provided with anti-rotation means for preventing said inner ring from rotating relative to the high-pressure trunnion.

In this configuration, since the inner ring of the roller bearing is not mounted directly on the high-pressure trunnion, the axial and radial size of the bearing can be reduced. In addition, since the inner ring is a part that is independent from the high-pressure trunnion, in the event of the roller bearing failing, it is not necessary to replace the high-pressure trunnion. The bearing is thus easier to maintain.

The inner ring may be disposed inside the high-pressure trunnion.

If so, the inner ring may include at least one notch that is intended to cooperate axially with at least one catch arranged in the downstream end of the high-pressure trunnion, so as to prevent said inner ring from rotating relative to the high-pressure trunnion.

The inner ring may also include a plurality of splines arranged at an upstream end and intended to cooperate radially with complementary splines of the high-pressure trunnion, so as to prevent said inner ring from rotating relative to the high-pressure trunnion.

In an alternative embodiment, at least a portion of the inner ring may be disposed outside the high-pressure trunnion. If so, the bearing may include at least one peg for being inserted radially into holes respectively in the inner ring and in the high-pressure trunnion, in order to prevent said inner ring from rotating relative to the high-pressure trunnion.

In another embodiment, the inner ring may be disposed in line with the high-pressure trunnion. If so, the inner ring may include a plurality of teeth, preferably of trapezoidal shape, arranged at an upstream end and intended to cooperate axially with a plurality of complementary teeth arranged at the downstream end of the high-pressure trunnion, so as to prevent said inner ring from rotating relative to the high-pressure trunnion.

The inner ring may be secured to the high-pressure trunnion by means of a clamping nut.

The present invention also provides an inner ring for a roller bearing as defined above.

The present invention further provides a high-pressure trunnion of a turbomachine, said trunnion being supported to rotate by a roller bearing as defined above.

BRIEF DESCRIPTION OF THE DRAWINGS

Other characteristics and advantages of the present invention appear from the following description, given with reference to the accompanying drawings which show a non-limiting embodiment. In the figures.

DETAILED DESCRIPTION OF AN EMBODIMENT

Figure 1:
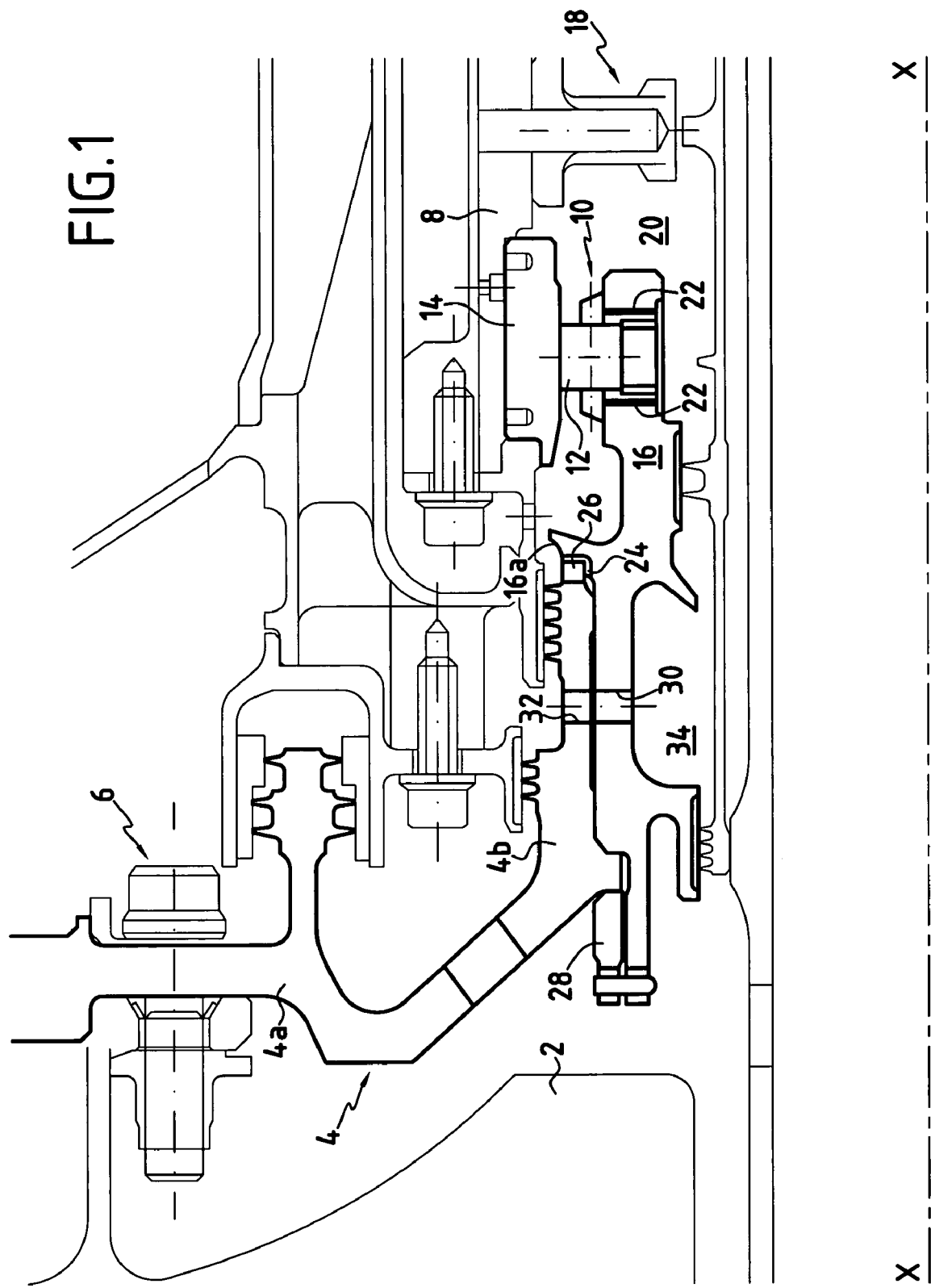
FIG. 1 is an axial and fragmentary section view showing the high-pressure spool of a turbomachine provided with a roller bearing in an embodiment of the invention.

FIG. 1 is an axial section showing a portion of the high-pressure spool of a turbomachine.

The high-pressure spool of the turbomachine of longitudinal axis X-X includes, in particular, a high-pressure turbine which consists of a plurality of rotor blades (not shown) that are subjected to the flow of hot gas coming from the combustion chamber (not shown). The blades are mounted on a high-pressure turbine disk 2 centered on the axis X-X.

The high-pressure turbine disk 2 rotates a shaft which is the trunnion of the shaft line of the high-pressure spool of the turbomachine.

The high-pressure trunnion 4 consists both of a substantially radial portion 4a that is secured to the high-pressure turbine disk 2 by a bolted connection 6, and of a portion 4b that extends along the axis downstream from the disk 2.

The high-pressure trunnion 4 is supported by a roller bearing 10 of the invention to rotate relative to a stationary support 8 that is connected to the casing of the turbomachine. In order to withstand the radial loads of the turbomachine, said bearing 10 is conventionally of the roller bearing type.

In a manner known in itself, the roller bearing 10 consists of rollers 12 that are inserted between an outer ring 14 disposed adjacent to the stationary support 8 and an inner ring 16 disposed adjacent to the high-pressure trunnion 4. Thus, the outer ring 14 and the inner ring 16 define races for the rollers 12.

Typically, the outer ring 14 is secured directly to the stationary support 8 that is connected to the turbomachine casing.

In addition, an oil injector 18 downstream from the roller bearing 10 is secured to the stationary support 8. Said injector serves to deliver oil from an oil enclosure 20 in which the roller bearing 10 is immersed. In particular, the oil in said enclosure is for lubricating and for cooling the rollers 12 of the roller bearing 10.

To this end, the inner ring 16 of the roller bearing 10 is provided with holes 22 which, under the effect of the centrifugal force generated by the high-pressure trunnion 4 rotating about the axis X-X, serve to channel the oil towards the rollers 12 in order to lubricate them and to cool them.

In the invention, the inner ring 16 of the roller bearing 10 extends along the axis beyond a downstream end of the high-pressure trunnion 4, to which said inner ring is secured by clamping means. Moreover, the inner ring 16 is provided with anti-rotation means for preventing said inner ring from rotating relative to the high-pressure trunnion 4.

Hence, the fact that the inner ring 16 is positioned beyond the downstream end of the high-pressure trunnion 4 reduces the radial height necessary for installing races for the rollers 12, thereby also reducing the radial size of the roller bearing 10.

In the embodiment of the invention shown in FIG. 1, the inner ring 16 of the roller bearing 10 is disposed inside the high-pressure trunnion 4.

More precisely, the inner ring 16, which is independent from the high-pressure trunnion 4, extends along the axis from the upstream end of the axial portion 4b of the high-pressure trunnion to beyond the downstream end of said axial portion.

Moreover, the inner ring 16 includes at least one notch 24 that is intended to cooperate axially with at least one catch 26 arranged in the downstream end of the high-pressure trunnion 4, so as to prevent said inner ring from rotating relative to the high-pressure trunnion 4.

More precisely, the notch(es) 24 is/are made in a radial shoulder 16a of the inner ring 16.

In order to secure the inner ring 16 to the high-pressure trunnion 4, a nut 28 is provided for being clamped against an upstream end of the inner ring. For this purpose, the upstream end of the inner ring 16 extends along the axis slightly beyond the upstream end of the axial portion 4b of the high-pressure trunnion 4.

When the nut 28 is clamped against the upstream end of the inner ring 16, said nut 28 comes into abutment against an upstream end of the axial portion 4b of the high-pressure trunnion 4, so as to prevent any relative movement in the axial direction between the inner ring 16 and the high-pressure trunnion 4.

The clamping nut 28 is positioned upstream from the roller bearing 10, unlike the clamping nuts of roller bearings known in the prior art, which nuts are typically placed upstream from the bearing. In this way, it is possible to reduce the axial size of the oil enclosure 20 downstream from the roller bearing 10.

In said embodiment, it can be observed that the inner ring 16 and the high-pressure trunnion 4 are each provided with a plurality of respective holes 30, 32, which allow ventilation air to flow outwards from an air enclosure 34 formed upstream from the oil enclosure 20. Of course, said holes 30, 32 are in radial alignment with one another.

Other embodiments of the roller bearing of the invention are described below, with reference to FIGS. 2 to 5.

Figure 2:
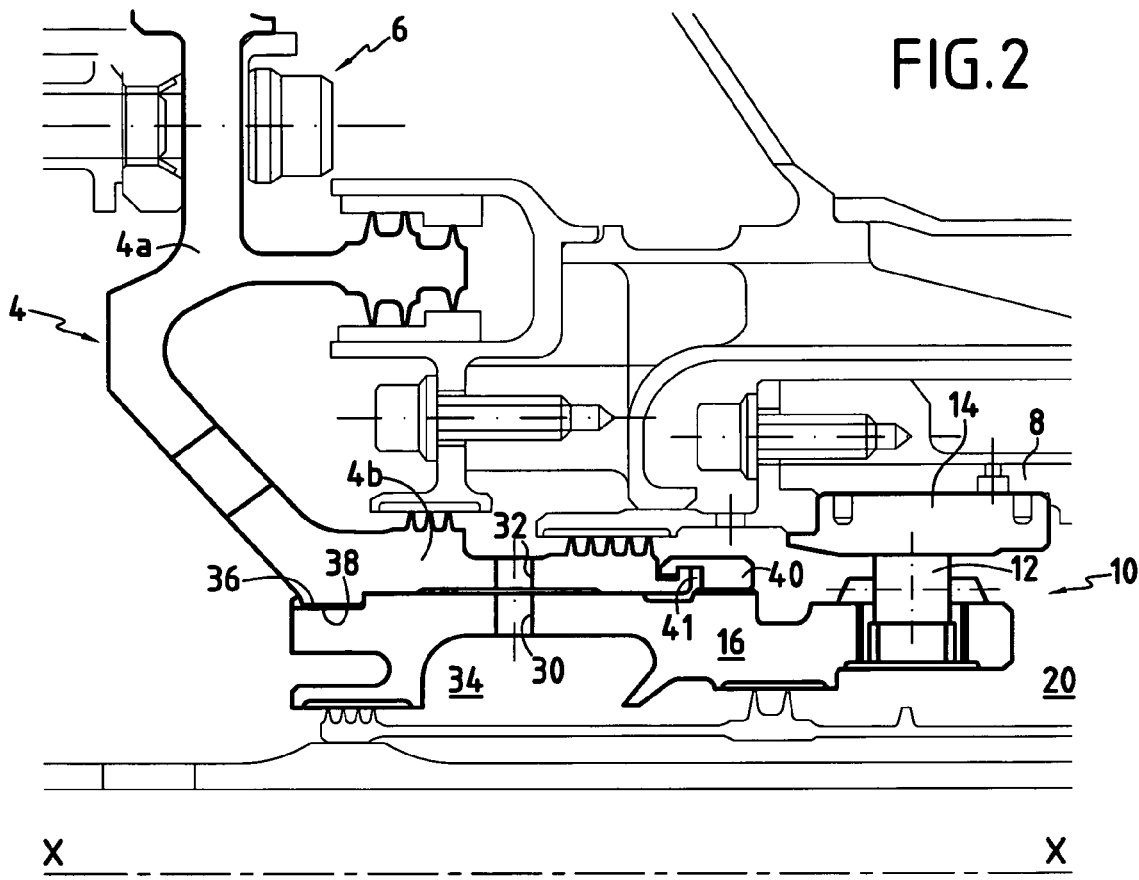
FIGS. 2 to 4 are axial section views showing roller bearings in other embodiments of the invention.

In the embodiment of the invention shown in FIG. 2, the inner ring 16 of the roller bearing 10 is also disposed inside said roller bearing, which inner ring is likewise independent from the high-pressure trunnion 4.

This embodiment differs from the above-described embodiment in its anti-rotation means and in its clamping means.

The inner ring 16 is prevented from rotating relative to the high-pressure trunnion 4 by splines 36 made at an upstream end of the inner ring, on its outer surface, and intended to cooperate with complementary splines 38 made at an upstream end of the axial portion 4b of the high-pressure trunnion, on its inner surface.

The inner ring 16 is secured to the high-pressure trunnion 4 by means of a clamping nut 40 for being clamped onto the inner ring, at the downstream end of the high-pressure trunnion 4, and more precisely at the downstream end of its axial portion 4b.

A bayonet system may be provided in order to lock the inner ring 16 axially to the high-pressure trunnion. With such a system, the clamping nut 40 presents a recess 41 which holds captive a radial shoulder formed at the downstream end of the high-pressure trunnion.

Since the clamping nut 40 is positioned upstream from the roller bearing 10, it is also possible to reduce the axial size of the bearing.

Figure 3:
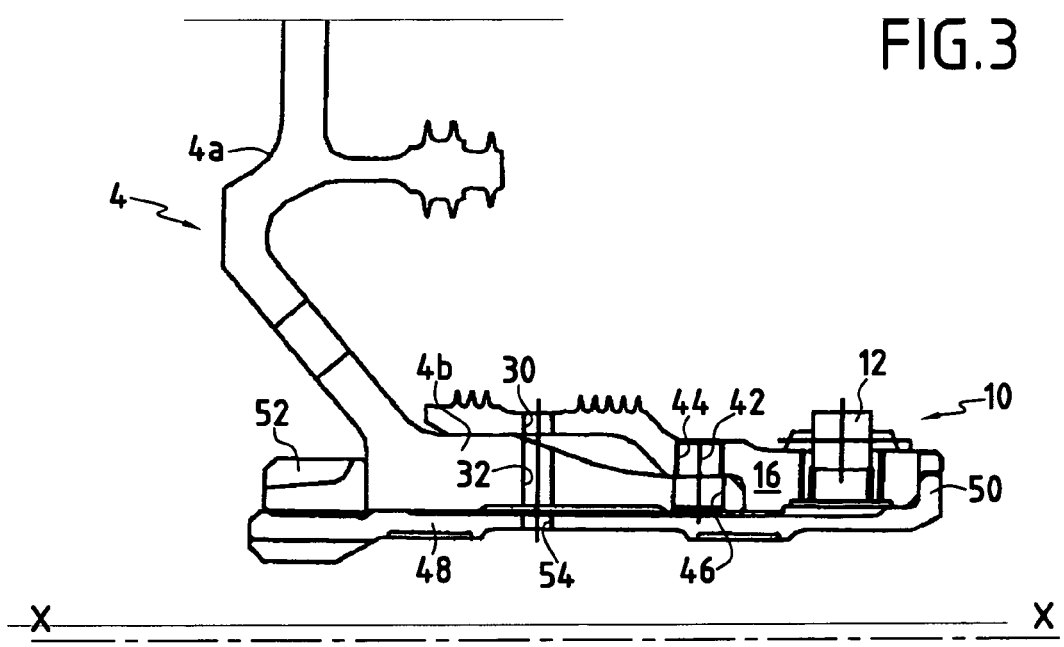

In the embodiment of the invention shown in FIG. 3, at least a portion of the inner ring 16 of the roller bearing 10 is disposed outside the high-pressure trunnion 4.

More precisely, the inner ring 16, which is independent from the high-pressure trunnion 4, includes an upstream portion that is disposed outside the axial portion 4b of the high-pressure trunnion and that is extended by a downstream portion extending beyond said axial portion.

The inner ring 16 includes at least one peg 42 for being inserted radially into respective holes 44, 46 in the inner ring 16 and in the high-pressure trunnion 4, in order to prevent the inner ring from rotating relative to the high-pressure trunnion.

By way of example, the holes 44, 46 may be provided in the downstream end of the axial portion 4b of the high-pressure trunnion 4.

In said embodiment, the roller bearing 10 also includes an additional ring 48 disposed inside the high-pressure trunnion 4.

Said additional ring 48 extends along the axis from an upstream end of the axial portion 4b of the high-pressure trunnion 4 as far as the downstream end of the inner ring 16.

The downstream end of the additional ring 48 is provided with a radial shoulder 50 for bearing axially against a downstream end of the inner ring 16.

Moreover, a nut 52 is provided for being clamped against an upstream end of the additional ring 48 in order to secure the inner ring 16 to the high-pressure trunnion 4.

To this end, the upstream end of the additional ring 48 extends along the axis slightly beyond the upstream end of the axial portion 4b of the high-pressure trunnion 4.

Like the embodiment described in connection with FIG. 1, when clamped against the upstream end of the additional ring 48, the nut 52 comes into abutment against an upstream end of the axial portion 4b of the high-pressure trunnion 4, so as to prevent any relative movement in the axial direction between the inner ring 16 and the high-pressure trunnion 4.

The clamping nut 52 is positioned upstream from the roller bearing 10, making it possible to reduce the axial size of the bearing.

It should be observed that, in order to ensure that ventilation air is evacuated effectively from the air enclosure, the additional ring 48 must also be provided with a plurality of holes 54 in radial alignment with the respective holes 30, 32 of the inner ring 16 and of the high-pressure trunnion 4.

Compared with the embodiments described above, the roller bearing described in connection with FIG. 3 presents the advantage of needing an inner ring that is easier to manufacture.

Figures 4, 5:
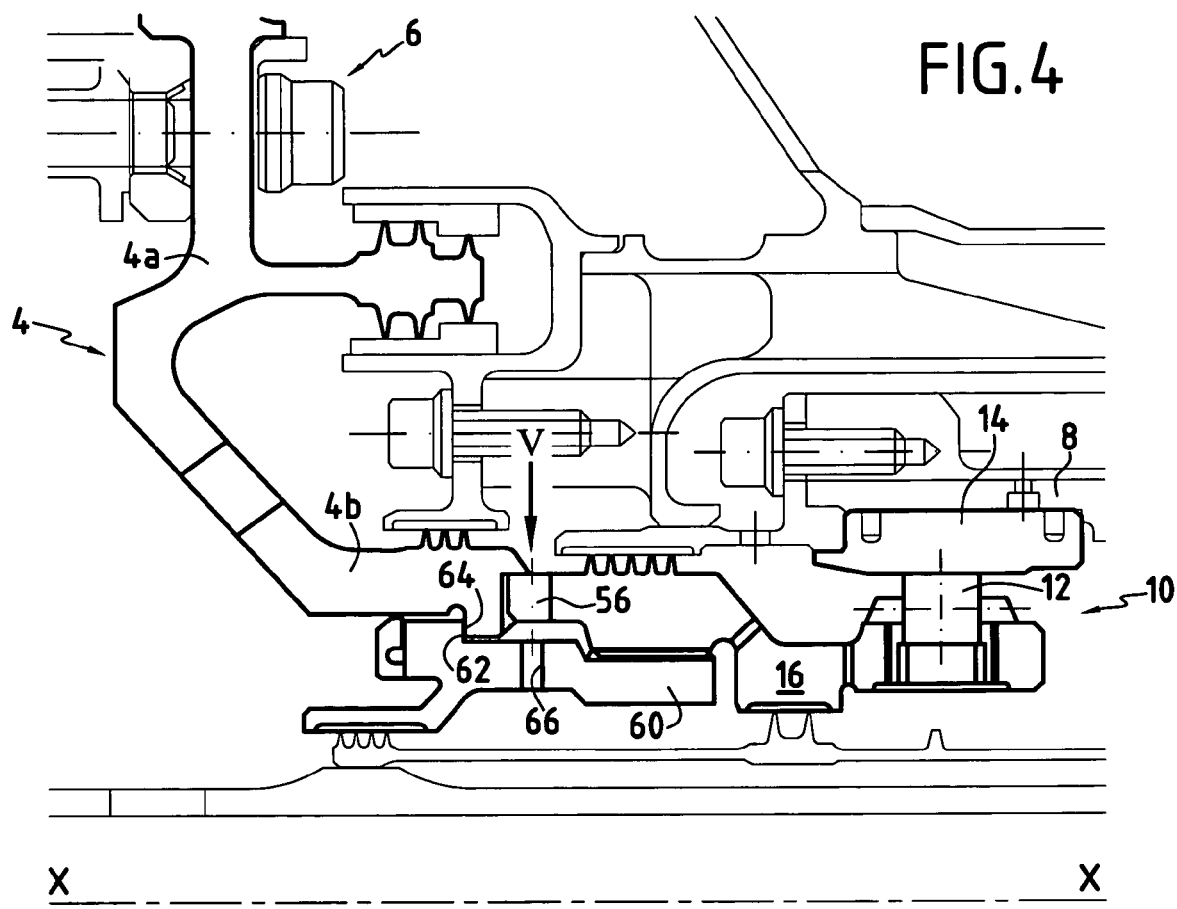
FIG. 5 is a section view on line V in FIG. 4.
Figure 6:
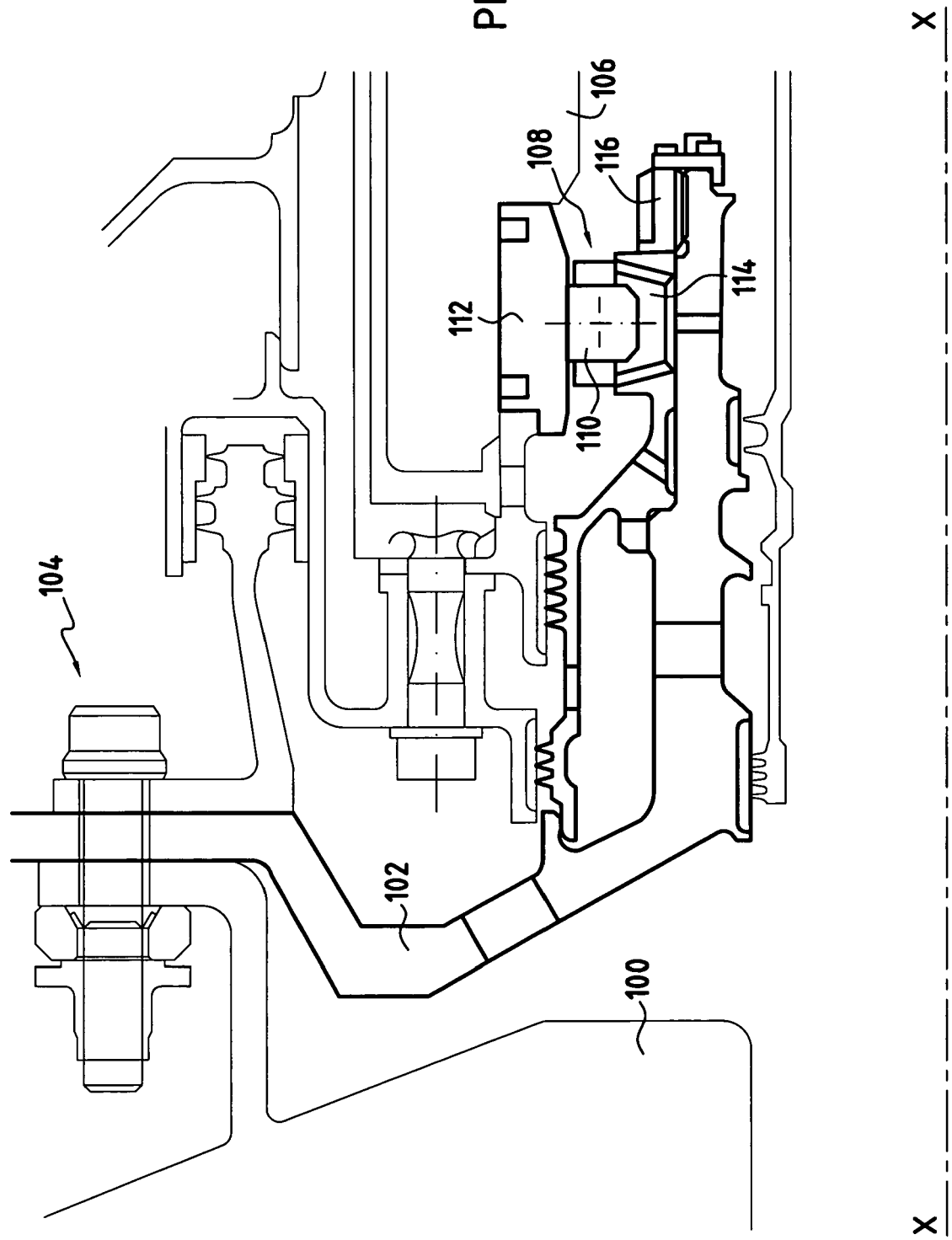
FIG. 6 shows a roller bearing known in the prior art.

In the embodiment of the invention shown in FIGS. 4 and 5, the inner ring 16 of the roller bearing 10, which is independent from the high-pressure trunnion 4, is disposed in line with said roller bearing 10, more particularly in line with its axial portion 4b.

In order to prevent the inner ring 16 from rotating relative to the high-pressure trunnion 4, said inner ring 16 includes a plurality of teeth 56 arranged at its upstream end.

Said teeth 56 are intended to cooperate axially with a plurality of complementary teeth 58 arranged at the downstream end of the high-pressure trunnion, and more particularly at the downstream end of its axial portion 4b.

The inner ring 16 is secured to the high-pressure trunnion 4 by a clamping nut 60 for being clamped against an upstream end of the inner ring 16.

More particularly, the clamping nut 60 is disposed inside the high-pressure trunnion 4 and inside the inner ring 16, its thread being arranged on its outer surface.

The nut 60 presents a radial shoulder 62 at its upstream end. When the nut 60 is clamped onto the inner ring 16, the shoulder 62 bears axially against a corresponding radial shoulder 64 of the high-pressure trunnion 4 so as to prevent any relative movement in the axial direction between the inner ring and the high-pressure trunnion 4.

The positioning of the clamping nut 60 upstream from the roller bearing 10 reduces the axial size of the bearing.

As shown in FIG. 5, the teeth 56, 58 of the inner ring 16 and of the high-pressure trunnion 4 preferably form a Curvic®-type coupling.

A Curvic®-type coupling is characterized by the fact that the drive is applied via axial splines having trapezoidal teeth. In FIG. 5, it can easily be seen that the teeth 56, 58 are of trapezoidal shape.

This type of coupling is particularly advantageous because it enables air to flow through the sets of teeth 56, 58. In the present application, it is thus possible to channel the ventilation air coming from the air enclosure through said coupling. Moreover, it is necessary for the clamping nut 60 to present a plurality of holes 66 that are in radial alignment with the sets of teeth 56, 58 of the coupling.

Another advantage of this kind of coupling resides in the fact that, during assembly of the roller bearing 10, it is easier to center the inner ring 16 on the high-pressure trunnion 4.

What is claimed is:

1. A turbomachine comprising:

a high-pressure turbine including a high pressure turbine disk and rotor blades mounted on the high pressure turbine disk, said blades being subject to a flow of hot gas from a combustion chamber, said flow of hot gas defining upstream and downstream directions for said turbomachine;

a high-pressure trunnion having an upstream end connected to the high pressure turbine disk and a downstream end extending downstream of said high pressure turbine disk; and a roller bearing that supports the high-pressure trunnion to rotate relative to a stationary support, said bearing comprising rollers, an inner ring and an outer ring, said rollers being inserted between said outer ring and said inner ring, said outer ring being disposed adjacent to the stationary support and said inner ring being disposed adjacent to the high-pressure trunnion, wherein the inner ring extends downstream beyond the downstream end of the high-pressure trunnion to which the inner ring is secured, said inner ring also being provided with an anti-rotation mechanism that prevents said inner ring from rotating relative to the high-pressure trunnion, wherein the rollers are disposed at the end of the inner ring which extends downstream beyond the downstream end of the high-pressure trunnion.

2. A turbomachine according to claim 1, wherein the inner ring is disposed inside the high-pressure trunnion.

3. A turbomachine according to claim 2, wherein the inner ring includes at least one notch that is arranged to cooperate axially with at least one catch arranged in the downstream end of the high-pressure trunnion, so as to prevent said inner ring from rotating relative to the high-pressure trunnion.

4. A turbomachine according to claim 3, including a nut for being clamped against an upstream end of the inner ring, in order to secure the inner ring to the high-pressure trunnion.

5. A turbomachine according to claim 2, wherein the inner ring includes a plurality of splines arranged at an upstream end and arranged to cooperate radially with complementary splines of the high-pressure trunnion, so as to prevent said inner ring from rotating relative to the high-pressure trunnion.

6. A turbomachine according to claim 5, including a nut for being clamped onto the inner ring, at the downstream end of the high-pressure trunnion, in order to secure the inner ring to the high-pressure trunnion.

7. A turbomachine according to claim 1, in which at least a portion of the inner ring is disposed outside the high-pressure trunnion, said bearing including at least one peg for being inserted radially into holes respectively in the inner ring and in the high-pressure trunnion, in order to prevent the inner ring from rotating relative to the high-pressure trunnion.

8. A turbomachine according to claim 7, including an additional ring disposed inside the high-pressure trunnion and having a downstream end that is provided with a radial shoulder for bearing axially against a downstream end of the inner ring, and also includes a nut for being clamped against an upstream end of the additional ring so as to secure the inner ring to the high-pressure trunnion.

9. A turbomachine according to claim 1, wherein the inner ring is disposed in line with the high-pressure trunnion.

10. A turbomachine according to claim 9, wherein the inner ring includes a plurality of teeth arranged at an upstream end and intended to cooperate axially with a plurality of complementary teeth arranged at the downstream end of the high-pressure trunnion, so as to prevent said inner ring from rotating relative to the high-pressure trunnion.

11. A turbomachine according to claim 10, including a nut for being clamped against an upstream end of the inner ring in order to secure the inner ring to the high-pressure trunnion.

12. A turbomachine according to claim 10, wherein the respective teeth of the inner ring and of the high-pressure trunnion are of trapezoidal shape.

13. A turbomachine according to claim 1, wherein the inner ring of the roller bearing is not mounted directly on the high-pressure trunnion.

* * * * *